US009670067B2

(12) United States Patent
Restorp et al.

(10) Patent No.: US 9,670,067 B2
(45) Date of Patent: Jun. 6, 2017

(54) PARTICLE OF MODIFIED SILICA

(71) Applicant: Akzo Nobel Chemicals International B.V., Amersfoort (NL)

(72) Inventors: Per Anders Restorp, Gothenburg (SE); Anders Törncrona, Bohus (SE); Johan Lif, Skärhamn (SE); Joakim Erik Patrik Högblom, Gothenburg (SE)

(73) Assignee: AKZO NOBEL CHEMICALS INTERNATIONAL B.V., Amersfoort (NL)

( * ) Notice: Subject to any disclaimer, the term of this patent is extended or adjusted under 35 U.S.C. 154(b) by 0 days.

(21) Appl. No.: 14/898,676

(22) PCT Filed: Jun. 20, 2014

(86) PCT No.: PCT/EP2014/063056
§ 371 (c)(1),
(2) Date: Dec. 15, 2015

(87) PCT Pub. No.: WO2014/206893
PCT Pub. Date: Dec. 31, 2014

(65) Prior Publication Data
US 2016/0122191 A1 May 5, 2016

(30) Foreign Application Priority Data
Jun. 24, 2013 (EP) ..................... 13173386

(51) Int. Cl.
*C01B 33/18* (2006.01)
*B01J 20/22* (2006.01)
*B01J 20/286* (2006.01)
*B01J 20/28* (2006.01)
*C09C 1/30* (2006.01)

(52) U.S. Cl.
CPC .............. *C01B 33/18* (2013.01); *B01J 20/22* (2013.01); *B01J 20/286* (2013.01); *B01J 20/28016* (2013.01); *C09C 1/3063* (2013.01); *C01P 2004/62* (2013.01); *C01P 2004/64* (2013.01); *C01P 2006/12* (2013.01); *C01P 2006/80* (2013.01)

(58) Field of Classification Search
CPC ... C01B 33/18; B01J 20/28016; B01J 20/286; B01J 20/22
See application file for complete search history.

(56) References Cited

U.S. PATENT DOCUMENTS

| 4,006,184 A | 2/1977 | Ilvespaa | |
| 4,107,140 A * | 8/1978 | Blount | C07F 7/045 521/154 |
| 4,235,767 A | 11/1980 | Blount | |
| 5,176,891 A | 1/1993 | Rushmere | |
| 2010/0178512 A1 | 7/2010 | Giesenberg et al. | |
| 2014/0231352 A1* | 8/2014 | Suri | B01J 20/288 210/656 |

FOREIGN PATENT DOCUMENTS

| WO | 2007/070001 A2 | 6/2007 |
| WO | 2013/092778 A2 | 6/2013 |

OTHER PUBLICATIONS

Zaragoza Dorwald, Side Reactions in Organic Synthesis, 2005, Wiley-VCH Verlag GmbH & Co. KGaA, Weinheim, Preface. p. IX.*
European Search Report for EP13173386.7, dated Nov. 26, 2013.
International Search Report and Written Opinion for PCT/EP2014/063056, date of mailing Jul. 11, 2014.
Iler, "The Chemistry of Silica,Solubility, Polymerization, Colloid and Surface Properties, and Biochemistry," Wiley, 1979, p. 465.
Zou, et al, "Polymer/Silica Nanocomposites: Preparation, Characterization, Properties, and Applications," Chemical Reviews, 2008, 108, pp. 3893-3957.
Sienel, G., "Epoxides," Ullmann's Encyclopedia of Industrial Chemistry, vol. 13, 2012, p. 139-154.
Yu, et al, "Crosslinked Epoxy Microspheres: Preparation, Surface-Initiated Polymerization, and Use as Macroporous Silica Porogen," Journal of Applied Polymer Sciences, 2013, pp. 2830-2939.
Kotsuki, et al, "Solvent-Free Organic Reactions on Silica Gel Supports, Facile Transformation of Epoxides to β-Halohydrins with Lithium Halides," Tetrahedron, vol. 54, 1998, pp. 2709-2722.
Liu, et al, "Poly(dimethylsiloxane) Star Polymers Having Nanosized Silica Cores," Macromol, Rapid Communications, 2004, 25, pp. 1392-1395.
Liu, et al, "A Novel Approach of Chemical Functionalization on Nano-Scaled Silica Particles," Institute of Physics Publishing, Nanotechnology 14 (2003), pp. 813-819.
Kang, et al, "Preparation and Characterization of Epoxy Composites filled with Functionalized Naonsilica Particles Obtained Via Sol-Gel Process," Polymer 42, (2001), pp. 879-887.
Hou, et al, "Preparation and Characterization of Silk/Silica Hybrid Biomaterials by Sol-Gel Crosslnking Process," Materials Science and Engineering B, 167, (2010), pp. 124-128.

(Continued)

*Primary Examiner* — Paul A Zucker
(74) *Attorney, Agent, or Firm* — McDonnell Boehnen Hulbert & Berghoff LLP

(57) ABSTRACT

The present invention relates to a particle of modified silica which comprises a particle of silica which is covalently linked to at least one halohydrin moiety. Furthermore, the present invention relates to a method of preparing the particle of modified silica, a particle of modified silica obtained by such method, use of the particle of modified silica as a stationary phase for chromatography, as well as a separation column for chromatography comprising the particle of modified silica.

15 Claims, No Drawings

(56) References Cited

OTHER PUBLICATIONS

Armini, et al, Composite Nanoparticles for Defectivity Reduction During CMP, 2004.
Sears, "Determination of Specific Surface Area of Colloidal Silica by Titration with Sodium Hydroxide," Analytical Chemistry, vol. 28, No. 12, Dec. 1956, pp. 1981-1983.

* cited by examiner

PARTICLE OF MODIFIED SILICA

This application is a national stage filing under 35 U.S.C. §371 of PCT/EP2014/063056, filed Jun. 20, 2014, which claims priority to European Patent Application No. 13173386.7, filed Jun. 24, 2013, the contents of which are each incorporated herein by reference in their entireties.

The present invention relates to a particle of modified silica, a method for its preparation and a particle of modified silica obtained by the method. The invention also relates to the use of the particle of modified silica as a stationary phase for chromatography, and a separation column for chromatography comprising the particle of modified silica.

BACKGROUND OF THE INVENTION

Chromatographic stationary phase separation materials used in high performance liquid chromatography (HPLC) are commonly based on a porous carrier of silica onto which a functionalization has been made in order to achieve the desired separation characteristics for a certain analyte to be separated. Common types of functionalization are the preparation of hydrophobic stationary phases, e.g. a $C_{18}$-phase, in which usually octadecylsilane is used as a functionalizing agent and reacted with silanol moieties of porous silica.

WO 2007/070001 discloses preparation of an organo-modified silica based material that can withstand high pH by mixing in an aqueous medium comprising from about 25 to about 100 weight % water, a silica based material(S) and one or more organosilane compounds (A), and reacting the mixture.

However, for various reasons, for example in applications when functionalization with a silane is not possible, it may be desirable to find an alternative to silane functionalization. Thus, there is a need for a cost efficient particle of modified silica that can be used as a stationary phase for chromatography, which is easily modified, simple to prepare, and which does not require any catalyst or promoter to prepare.

It would be desirable to provide a particle of modified silica which can be used as a stationary phase for chromatography, which has not been functionalized with a silane, which is easily modified and simple to prepare.

An object of the present invention is therefore to provide such a particle of modified silica, a method for its preparation and various uses of the particle of modified silica.

SUMMARY OF THE INVENTION

According to one aspect, the invention relates to a particle of modified silica in which a particle of silica is covalently linked to at least one halohydrin moiety.

According to another aspect, the invention relates to a method of preparing a particle of modified silica which comprises reacting a particle of silica and at least one halohydrin compound to form a covalent bond between said particle of silica and said halohydrin compound.

According to a yet another aspect, the invention relates to a particle of modified silica obtainable by the method of the invention.

According to another aspect, the invention relates to use of a particle of modified silica as a stationary phase for chromatography.

According to a yet another aspect, the invention relates to a separation column for chromatography comprising the particle of modified silica.

These and further aspects of the invention will be described in more detail below.

DETAILED DESCRIPTION OF THE INVENTION

According to a first aspect of the invention, the particle of modified silica of the invention contains a particle of silica (represented by $SiO_2$) which may be in the form of a porous particle or a monolithic material. Preferably, it has an average particle diameter ranging from 1.5 to 25 µm. As conventional in silica chemistry, the particle size refers to the average size of the primary particles.

In an embodiment, the particle of modified silica has the formula (I):

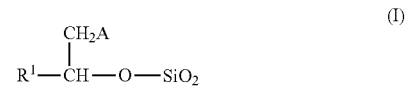

wherein A is a halogen, $SiO_2$ is silica, and $R^1$ is selected from hydrogen, optionally substituted alkyl, alkenyl, alkynyl, aryl, alkylaryl, arylalkyl, heteroalkyl, heterocycle, alkylheterocycle, or heterocyclealkyl, or combinations thereof.

For the purpose of the present invention, the term "halohydrin compound" refers to an organic compound containing adjacent carbon atoms, where one carbon has a halogen substituent and the other carbon has a hydroxyl substituent.

For the purpose of the present invention, the term "halohydrin moiety" refers to the moiety obtained (in bold in formula (I) above) when a halohydrin compound is reacted with a silica, and covalently linked to the silica.

For the purpose of the present invention, "particle of modified silica" refers to a particle of silica which is covalently linked to the halohydrin moiety.

For the purpose of the present invention, the term "halogen" refers to fluorine, chlorine, bromine, and iodine. Examples of halogens include chlorine, bromine or fluorine, most preferably chlorine.

Halohydrin compounds comprising any $R^1$ moiety may, for examples, be obtained by reacting epoxides with hydrogen halids, see page 141, Sienel, G., Rieth, R. and Rowbottom, K. T. 2000, "Epoxides", Ullmann's Encyclopedia of Industrial Chemistry. Chlorohydrins may be obtained by reacting epichlorohydrins with active hydrogen, see p. 147 of the reference cited above. Nitrogen containing halohydrin compounds may also be obtained according to the description of pending patent application PCT/EP2012/076254 (publication number WO 2013/092778), which is incorporated herein by reference, wherein a secondary amine is reacted with an epihalohydrin. The person skilled in the art knows how to modify the halohydrin compound by selecting different $R^1$ moieties. It is also apparent for the person skilled in the art that halohydrin compounds may also have an $R^1$ substituent on the carbon atom carrying the halogen.

The term "alkyl" refers to a straight, branched chain and/or cyclic ("cycloalkyl") hydrocarbon having from 1 to 30 (e.g. 1 to 20, or 1 to 4) carbon atoms. Alkyl moieties having from 1 to 4 carbons are referred to as "lower alkyl." Examples of alkyl moieties include methyl, ethyl, propyl, isopropyl, n-butyl, t-butyl, isobutyl, pentyl, hexyl, isohexyl, heptyl, 4,4-dimethylpentyl, octyl, 2,2,4-trimethylpentyl, nonyl, decyl, undecyl and dodecyl. Cycloalkyl moieties may be monocyclic or multicyclic, and examples include cyclopropyl, cyclobutyl, cyclopentyl, cyclohexyl and adamantyl.

Additional examples of alkyl moieties have linear, branched and/or cyclic portions (e.g. 1-ethyl-4-methyl-cyclohexyl). The term "alkyl" includes saturated hydrocarbons.

The term "alkenyl" refers to a straight, branched chain and/or cyclic hydrocarbon having from 2 to 30 (e.g. 2 to 20, or 2 to 6) carbon atoms, and including at least one carbon-carbon double bond. Representative alkenyl moieties include vinyl, allyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, 1-hexenyl, 2-hexenyl, 3-hexenyl, 1-heptenyl, 2-heptenyl, 3-heptenyl, 1-octenyl, 2-octenyl, 3-octenyl, 1-nonenyl, 2-nonenyl, 3-nonenyl, 1-decenyl, 2-decenyl and 3-decenyl.

The term "alkynyl" refers to a straight, branched chain or cyclic hydrocarbon having from 2 to 30 (e.g. 2 to 20, or 2 to 6) carbon atoms, and including at least one carbon-carbon triple bond. Representative alkynyl moieties include acetylenyl, propynyl, 1-butynyl, 2-butynyl, 1-pentynyl, 2-pentynyl, 3-methyl-1-butynyl, 4-pentynyl, 1-hexynyl, 2-hexynyl, 5-hexynyl, 1-heptynyl, 2-heptynyl, 6-heptynyl, 1-octynyl, 2-octynyl, 7-octynyl, 1-nonynyl, 2-nonynyl, 8-nonynyl, 1-decynyl, 2-decynyl and 9-decynyl.

The term "aryl" refers to an aromatic ring or an aromatic or partially aromatic ring system composed of carbon and hydrogen atoms. An aryl moiety may comprise multiple rings bound or fused together. Examples of aryl moieties include anthracenyl, azulenyl, biphenyl, fluorenyl, indan, indenyl, naphthyl, phenanthrenyl, phenyl, 1,2,3,4-tetrahydro-naphthalene and tolyl.

The term "alkylaryl" or "alkyl-aryl" refers to an alkyl moiety bound to an aryl moiety, whereas the term "arylalkyl" or "aryl-alkyl" refers to an aryl moiety bound to an alkyl moiety.

The term "alkylheteroaryl" or "alkyl-heteroaryl" refers to an alkyl moiety bound to a heteroaryl moiety.

The term "alkylheterocycle" or "alkyl-heterocycle" refers to an alkyl moiety bound to a heterocycle moiety.

The term "alkoxy" refers to an —O-alkyl moiety. Examples of alkoxy moieties include —OCH$_3$, —OCH$_2$CH$_3$, —O(CH$_2$)$_2$CH$_3$, —O(CH$_2$)$_3$CH$_3$, —O(CH$_2$)$_4$CH$_3$, and —O(CH$_2$)$_5$CH$_3$.

The term "heteroalkyl" refers to an alkyl moiety (e.g. linear, branched or cyclic) in which at least one of its carbon atoms has been replaced with a heteroatom, e.g. N, O or S.

The term "heteroaryl" refers to an aryl moiety wherein at least one of its carbon atoms has been replaced with a heteroatom, e.g. N, O or S. Examples of heteroaryl moieties include acridinyl, benzimidazolyl, benzofuranyl, benzoisothiazolyl, benzoisoxazolyl, benzoquinazolinyl, benzothiazolyl, benzoxazolyl, furyl, imidazolyl, indolyl, isothiazolyl, isoxazolyl, oxadiazolyl, oxazolyl, phthalazinyl, pyrazinyl, pyrazolyl, pyridazinyl, pyridyl, pyrimidinyl, pyrimidyl, pyrrolyl, quinazolinyl, quinolinyl, tetrazolyl, thiazolyl, and triazinyl.

The term "heteroarylalkyl" or "heteroaryl-alkyl" refers to a heteroaryl moiety bound to an alkyl moiety.

The term "heterocycle" refers to an aromatic, partially aromatic or non-aromatic monocyclic or polycyclic ring or ring system comprised of carbon, hydrogen and at least one heteroatom, e.g. N, O or S. A heterocycle may comprise multiple, i.e., two or more, rings fused or bound together. Heterocycles include heteroaryls. Other examples include benzo[1,3]dioxolyl, 2,3-dihydro-benzo[1,4]dioxinyl, cinnolinyl, furanyl, hydantoinyl, morpholinyl, oxetanyl, oxiranyl, piperazinyl, piperidinyl, pyrrolidinonyl, pyrrolidinyl, tetrahydrofuranyl, tetrahydropyranyl, tetrahydropyridinyl, tetrahydropyrimidinyl, tetrahydrothiophenyl, tetrahydrothiopyranyl and valerolactamyl.

The term "heterocyclealkyl" or "heterocycle-alkyl" refers to a heterocycle moiety bound to an alkyl moiety.

The term "heterocycloalkyl" refers to a non-aromatic heterocycle.

The term "heterocycloalkylalkyl" or "heterocycloalkyl-alkyl" refers to a heterocycloalkyl moiety bound to an alkyl moiety.

The term "substituted," when used to describe a chemical structure or moiety, refers to a derivative of that structure or moiety wherein one or more of its hydrogen atoms is substituted with an atom, chemical moiety or functional moiety such as, but not limited to, alcohol, aldehyde, alkoxy, alkanoyloxy, alkoxycarbonyl, alkenyl, alkyl (e.g., methyl, ethyl, propyl, t-butyl), alkynyl, alkylcarbonyloxy (—OC(O)alkyl), amide (—C(O)NH-alkyl- or -alkyl-NHC(O)alkyl), amidinyl (—C(NH)NH-alkyl or —C(NR)NH$_2$), amine (primary, secondary and tertiary such as alkylamino, arylamino, arylalkylamino), aroyl, aryl, aryloxy, azo, carbamoyl (—NHC(O)O-alkyl- or —OC(O)NH-alkyl), carbamyl (e.g. CONH$_2$, as well as CONH-alkyl, CONH-aryl, and CONH-arylalkyl), carbonyl, carboxyl, carboxylic acid, carboxylic acid anhydride, carboxylic acid chloride, cyano, ester, epoxide, ether (e.g. methoxy, ethoxy), guanidino, halo, haloalkyl (e.g. —CCl$_3$, —CF$_3$, —C(CF$_3$)$_3$), heteroalkyl, hemiacetal, imine (primary and secondary), ketone, nitrile, nitro, oxygen (i.e., to provide an oxo moiety), phosphodiester, sulfide, sulfonamido (e.g. SO$_2$NH$_2$), sulfone, sulfonyl (including alkylsulfonyl, arylsulfonyl and arylalkylsulfonyl), sulfoxide, thiol (e.g. sulfhydryl, thioether) and urea (—NHCONH-alkyl-).

In an embodiment, R$^1$ comprises an aryl moiety. In an embodiment, R$^1$ comprises a steroid moiety, such as a steroid hormone or cholesterol.

In an embodiment, R$^1$ comprises R$^2$—O—CH$_2$—, wherein R$^2$ is selected from hydrocarbons having from 1 carbon atom up to 30 carbon atoms, preferably from 4 carbon atoms up to 18 carbon atoms. In an embodiment, R$^2$ may also be chosen among ethers having from 1 carbon atom up to 30 carbon atoms, preferably from 4 to 18 carbon atoms.

In an embodiment, R$^1$ is:

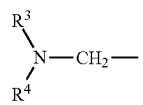

wherein R$^3$ and R$^4$, independently from each other, are selected from hydrocarbons having from 1 to 30 carbon atoms, preferably from 4 to 18, or from 8 to 18, or from 12 to 18, or from 16 to 18 carbon atoms. In one embodiment, R$_3$ and R$_4$ are tolyl moieties.

In an embodiment, R$^1$ is:

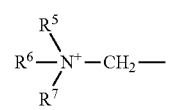

wherein R$^5$, R$^6$ and R$^7$, independently from each other, are selected from hydrocarbons having from 1 to 4 carbon atoms, preferably from 1 to 2 carbon atoms. In one embodiment, $R^5$, $R^6$ and $R^7$ are methyl moieties.

The particle of modified silica may have a surface density of the halohydrin moiety to silica surface from 0.05 to 4, or from 0.1 to 3.5, μmoles/m² silica surface.

A large share of unreacted silanol moieties of the particle of modified silica may make the material susceptible to acidic hydrolysis, due to the polar nature of the surface moieties. Therefore, end-capping of the reactive silanol moieties with, e.g. trimethylchlorosilane or dimethyldichlorosilane, may be made.

The present inventors have surprisingly found that by modifying the particle of silica according to the invention, a covalently linked particle of modified silica may be obtained which is easily modified, and may be used for various applications and functionalities.

According to yet another aspect of the invention, it relates to a method of preparing a particle of modified silica which comprises reacting a particle of silica and at least one halohydrin compound to form a covalent bond between said particle of silica and said halohydrin compound.

In an embodiment, the halohydrin compound has the formula (II):

(II)

wherein A is a halogen, and $R^1$ is selected from hydrogen, optionally substituted alkyl, alkenyl, alkynyl, aryl, alkylaryl, arylalkyl, heteroalkyl, heterocycle, alkylheterocycle, or heterocyclealkyl, or combinations thereof.

The particle of silica may be obtained from e.g. precipitated silica, micro silica (silica fume), pyrogenic silica (fumed silica), silica sols or silica gels, and mixtures thereof. The particle of silica may be in the form of a porous particle or a monolithic material. Preferably, it has an average particle diameter ranging from 1.8 to 25 μm. The particle diameter may be calculated from the formula relating to specific surface area and particle diameter in Iler (The Chemistry of Silica, Wiley, 1979). As conventional in silica chemistry, the particle size refers to the average size of the primary particles.

Suitably, the particle of silica has a specific surface area from 20 to 1500, preferably from 50 to 900, and most preferably from 70 to 800 m²/g. The specific surface area can be measured by means of titration with sodium hydroxide as described by Sears in Analytical Chemistry 28(1956), 12, 1981-1983 and in U.S. Pat. No. 5,176,891. The given area thus represents the average specific surface area of the particles.

For the method according to the invention, preferred A and $R^1$ may be as disclosed above for the particle of modified silica.

The reaction of the halohydrin compound with the particle of silica is performed at a temperature suitable for performing the reaction, preferably from 40 to 180, more preferably from 60 to 160, and most preferably from 80 to 140° C.

Preferably, the halohydrin compound may be added to the particle of silica under agitation and at a controlled rate, until a suitable amount of halohydrin compound has been added. The reaction time may be from 1 to 24 hours.

The reaction of the halohydrin compound and the particle of silica may be carried out in an organic solvent, preferably under stirring. Such an organic solvent is preferably an aprotic solvent. Examples of such an aprotic solvent may be acetonitrile, acetone, xylene or toluene, preferably toluene, or mixtures thereof.

The particle of silica may be added to the solvent, followed by an optional step of evaporating any water present. The halohydrin compound may then be added to a solvent, and thereafter added to the dispersion of particle of silica and solvent.

Preferably, the proportion of the halohydrin compound is from 4 to 8 μmoles per m² particle of silica surface. The amount of solvent is preferably selected in such a way that the amount of particle of silica in the dispersion is from 5 to 20 wt %.

The silanol surface moieties on the particle of silica react with the halohydrin compound, to form a covalent link between the silica and the halohydrin compound.

When the dispersion of particle of modified silica has been formed, the dispersion may be cooled and purified, e.g. by ultra filtration, or by washing, e.g. by using toluene, ethanol or formic acid. The dispersion may then be dried, for example at 40 to 100° C., preferably at 60 to 90° C., for 2 to 30 hours, preferably from 10 to 25 hours.

According to a further aspect, the present invention relates to a particle of modified silica obtainable by the method described above.

According to yet another aspect, the present invention relates to the use of the particle of modified silica as a stationary phase for chromatography. The particle of modified silica may thus be used in chromatographic separation methods, such as HPLC, supercritical fluid chromatography (SFC), and simulating moving bed (SMB).

The pore volume of the particle of modified silica containing stationary phase is suitably from 0.1 to 4 ml/g, preferably from 0.2 to 2 ml/g, most preferably from 0.3 to 1.2 ml/g.

The specific surface area (BET method) of the particle of modified silica containing stationary phase is suitably from 1 to 1000 m²/g, preferably from 25 to 700 m²/g, most preferably from 50 to 500 m²/g.

According to another aspect, the present invention relates to a separation column for chromatography comprising the particle of modified silica of the present invention. In this aspect, the particles of modified silica of the invention have been packed into the separation column.

EXAMPLES

The invention is further illustrated in the following Examples which, however, are not intended to limit the same. Parts and % relate to parts by weight and % by weight, respectively, unless otherwise stated.

The following reactants were used in the Examples:

Particles of Silica:
Silica particles having an average particle size of 5 μm, an average pore size of 100 Å and a specific surface area of 320 m²/g (Kromasil® KR-100-5 SIL of AkzoNobel).
Silica particles having an average particle size of 13 μm, an average pore size of 100 Å and a specific surface area of 320 m²/g (Kromasil® KR-100-13 SIL AkzoNobel).

Halohydrins:
Compounds described below obtained by reacting epichlorohydrins with amines or alcohols, see for example pending patent application PCT/EP2012/076254 (publication number WO 2013/092778):

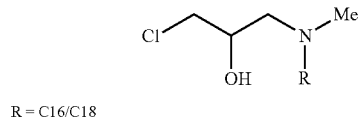

Compound 1

R = C16/C18

R represents a mixture of alkyls (predominantly $C_{16}/C_{18}$ alkyls) derived from hydrogenated tallow oil, and Me represents a methyl moiety.

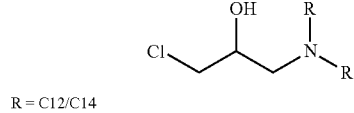

Compound 2

R = C12/C14

R represents a mixture of alkyls (predominantly $C_{12}/C_{14}$ alkyls) derived from coconut oil.

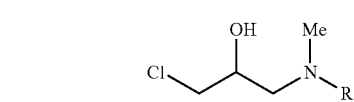

Compound 3

R = C12/C14

R represents a mixture of alkyls (predominantly $C_{12}/C_{14}$ alkyls) derived from coconut oil, and Me represents a methyl moiety.

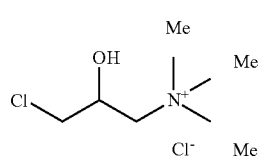

Compound 4

Mw=188.1 g/mol, and Me represent methyl moieties.

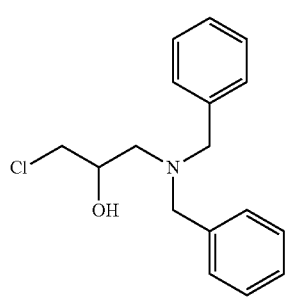

Compound 5

Mw=289.8 g/mol

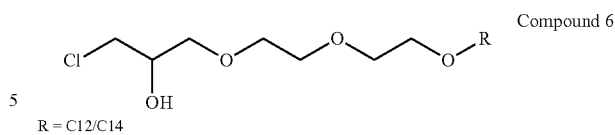

Compound 6

R = C12/C14

R represents a mixture of alkyls (predominantly $C_{12}/C_{14}$ alkyls) derived from coconut oil.

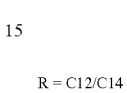

Compound 7

R = C12/C14

R represents a mixture of alkyls (predominantly $C_{12}/C_{14}$ alkyls) derived from coconut oil.

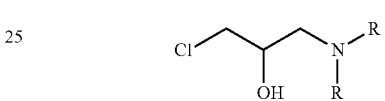

Compound 8

R = C16/C18

R represents a mixture of alkyls (predominantly $C_{16}/C_{18}$ alkyls) derived from hydrogenated tallow oil.

Example 1

This Example illustrates the preparation of particles of modified silica.

10 g of KR-100-5 SIL was added to 87.6 g toluene. The resulting dispersion was heated to evaporate 8.7 g of toluene. After heating, the dispersion was cooled to 105° C. 2 g of compound 1 was added to 20 g toluene, and was thereafter added quickly to the dispersion of toluene and KR-100-5 SIL under stirring. The temperature of the oil bath was set at 120° C., and the dispersion was refluxed over night. The reaction was cooled to 70° C., and the dispersion was washed with 2×108.4 g toluene and 2×108.4 g ethanol. It was dried at 60° C. and $10^4$ Pa over night. The resulting powder was vanilla coloured. Elemental analysis of carbon and nitrogen contents gave 10.2 wt % C and 0.3 wt % N.

Conventional standard chromatographic separation with the modified particles obtained was achieved successfully.

Example 2

This Example illustrates the preparation of other particles of modified silica.

10 g of KR-100-5 SIL was added to 108.4 g toluene. The resulting dispersion was heated to evaporate 8.7 g of toluene. 2 g of compound 1 was added to 17 g toluene, and was thereafter added quickly to the dispersion of toluene and KR-100-5 SIL under stirring. The temperature of the oil bath was set at 110° C., and the dispersion was refluxed over night. The reaction was cooled to 70° C., and the dispersion was washed with 2×108.4 g toluene and 3×108.4 g ethanol. It was dried at 60° C. and $10^4$ Pa over night. Elemental analysis of carbon content gave 8.3 wt % C.

Example 3

This Example illustrates the preparation of other particles of modified silica.

20 g of KR-100-5 SIL was added to 173.4 g toluene. The resulting dispersion was heated to evaporate 17 g of toluene. 13.5 g of compound 1 was added to 17 g toluene, and was thereafter added quickly to the dispersion of toluene and KR-100-5 SIL under stirring. The temperature of the oil bath was set at 125° C., and the dispersion was refluxed over night. The reaction was cooled to 70° C., and the dispersion was washed with 2×195 g toluene and 2×195 g ethanol. It was dried at 90° C. over night. Elemental analysis of carbon content gave 12.4 wt % C.

Conventional standard chromatographic separation with the modified particles obtained was achieved successfully.

Example 4

This Example illustrates the preparation of other particles of modified silica.

20 g of KR-100-5 SIL was added to 173.4 g toluene. The resulting dispersion was heated to evaporate 17 g of toluene. 10.8 g of compound 2 was added to 26 g toluene, and was thereafter added quickly to the dispersion of toluene and KR-100-5 SIL under stirring at 100° C. The temperature of the oil bath was set at 125° C., and the dispersion was refluxed over night. The reaction was cooled to 70° C., and the dispersion was washed with 2×195 g toluene and 2×195 g ethanol. It was dried at 90° C. over night. Elemental analysis of carbon content gave 13.2 wt % C.

Conventional standard chromatographic separation with the modified particles obtained was achieved successfully.

Example 5

This Example illustrates the preparation of other particles of modified silica.

20 g of KR-100-5 SIL was added to 173.4 g toluene. The resulting dispersion was heated to evaporate 17 g of toluene at a temperature of 135° C. 10.0 g of compound 3 was added to 17 g toluene, and was thereafter added quickly to the dispersion of toluene and KR-100-5 SIL under stirring at 100° C. The temperature of the oil bath was set at 125° C., and the dispersion was refluxed over night. The reaction was cooled to 70° C., and the dispersion was washed with 2×195 g toluene and 2×195 g ethanol, and 87.6 g HCOOH+130 g ethanol. It was dried at 90° C. over night. Elemental analysis of carbon content gave 11.2 wt % C.

Example 6

This Example illustrates the preparation of other particles of modified silica.

10 g of KR-100-13 SIL was added to a mixture of 80.4 g toluene/49.4 g methanol/14.5 g 1-propanol/3.2 g water and 4.8 g of compound 4. The resulting dispersion was heated to evaporate 90 ml a methanol/1-propanol/water/toluene solution. Then, 43.3 g toluene was added to the dispersion and the dispersion was heated to evaporate 30 ml methanol/1-propanol/water/toluene solution. Thereafter, 38.9 g toluene was added to the dispersion and the dispersion was heated to evaporate 30 ml methanol/1-propanol/water/toluene solution. The temperature of the oil bath was set at 125° C., and the dispersion was refluxed over night. The reaction was cooled to 70° C., and the dispersion was washed with 2×79.1 g methanol, 100 g water, and 79.1 g methanol. It was dried at 60° C. and $10^4$ Pa over night. The resulting powder was colourless. Elemental analysis of carbon content gave 0.9 wt % C.

Conventional standard ion-exchange chromatographic separation with the modified particles obtained was achieved successfully.

Example 7

This Example illustrates the preparation of other particles of modified silica.

10 g of KR-100-5 SIL was added to 86.5 g toluene. The resulting dispersion was heated to evaporate 8.7 g of toluene. After heating, the dispersion was cooled to 95° C. 9.4 g of compound 5 was added to the dispersion of toluene and KR-100-5 SIL under stirring. The temperature of the oil bath was set at 125° C., and the dispersion was refluxed over night. The reaction was cooled to 70° C., and the dispersion was washed with 79 g ethanol, 87 g toluene and 79 g ethanol. It was dried at 90° C. over night. The resulting powder was vanilla coloured. Elemental analysis of carbon content gave 10.8 wt % C.

Conventional standard chromatographic separation with the modified particles obtained was achieved successfully.

Example 8

This Example illustrates the preparation of other particles of modified silica.

15 g of KR-100-5 SIL was added to 129.8 g toluene. The resulting dispersion was heated to evaporate 13 g of toluene. After heating, the dispersion was cooled to 85° C. 16 g of compound 6 was added to the dispersion of toluene and KR-100-5 SIL under stirring. The temperature of the oil bath was set at 130° C., and the dispersion was refluxed over night. The reaction was cooled to 40° C., and the dispersion was washed with 79 g ethanol, 87 g toluene and 79 g ethanol. It was dried at 90° C. over night. The resulting powder was colourless. Elemental analysis of carbon content gave 10.6 wt % C.

Conventional standard chromatographic separation with the modified particles obtained was achieved successfully.

Example 9

This Example illustrates the preparation of other particles of modified silica.

15 g of KR-100-5 SIL was added to 129.8 g toluene. The resulting dispersion was heated to evaporate 13 g of toluene. After heating, the dispersion was cooled to 85° C. 14.3 g of compound 7 was added to the dispersion of toluene and KR-100-5 SIL under stirring. The temperature of the oil bath was set at 130° C., and the dispersion was refluxed over night. The reaction was cooled to 40° C., and the dispersion was washed with 79 g ethanol, 87 g toluene and 79 g ethanol. It was dried at 90° C. over night. The resulting powder was colourless. Elemental analysis of carbon content gave 11.6 wt % C.

Example 10

This Example illustrates the preparation of other particles of modified silica.

15 g of KR-100-5 SIL was added to 129.8 g toluene. The resulting dispersion was heated to evaporate 13 g of toluene. After heating, the dispersion was cooled to 85° C. 14.3 g of compound 8 was added to the dispersion of toluene and KR-100-5 SIL under stirring. The temperature of the oil bath was set at 130° C., and the dispersion was refluxed over night. The reaction was cooled to 40° C., and the dispersion was washed with 79 g ethanol, 87 g toluene and 79 g ethanol. It was dried at 90° C. over night. The resulting powder was colorless. Elemental analysis of carbon content gave 11.6 wt % C.

Conventional standard chromatographic separation with the modified particles obtained was achieved successfully.

The invention claimed is:

1. A particle of modified silica, wherein the modified silica is of formula (I):

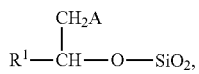

wherein A is a halogen, $SiO_2$ is silica, and $R^1$ is optionally substituted alkyl, alkenyl, alkynyl, aryl, alkylaryl, arylalkyl, heteroalkyl, heterocycle, alkylheterocycle, heterocyclealkyl, or a combination thereof, or $R^1$ is a steroid, wherein the optionally substituted alkyl is an alkyl optionally substituted with a aldehylde; alkoxy; alkanoyloxy; alkoxycarbonyl; alkenyl; alkyl; alkynyl; alkylcarbonyloxy; -alkylNHC(O)alkyl; —C(NH)NH-alkyl; alkylamine; arylamino; arylalkylamino; when the alkyl is —CH$_2$—, (a) $R^O$—O—, wherein $R^O$ is a hydrocarbon of 1 to 30 carbons, (b) $(R^{N1})_2$—N—, wherein each $R^{N1}$ is independently a hydrocarbon of 1 to 30 carbons or (c) $(R^{N2})_3$—N$^+$—, wherein each $R^{N2}$ is independent a hydrocarbon of 1 to 4 carbons; aroyl; aryl; aryloxy; azo; —OC(O)NH-alkyl; CONH$_2$; —CONH-alkyl, —CONH-aryl, —CONH-arylalkyl; carboxyl; cyano; methoxy; ethoxy; guanidine, halo, haloalkyl; heteroalkyl; nitrile; nitro; oxo; —SO$_2$NH$_2$; alkylsulfonyl; arylsulfonyl; arylalkylsulfonyl; —NHCONH-alkyl.

2. The particle of modified silica according to claim 1, wherein the silica is in the form of a porous particle or a monolithic material.

3. The particle of modified silica according claim 1, wherein A is chlorine.

4. The particle of modified silica according to claim 1, wherein $R^1$ is an aryl moiety.

5. The particle of modified silica according to claim 1, wherein $R^1$ is a steroid moiety.

6. The particle of modified silica according to claim 1, wherein $R^1$ is $R^2$—O—CH$_2$—, and $R^2$ is a hydrocarbon having from 1 carbon atom up to 30 carbon atoms.

7. The particle of modified silica according to claim 1, wherein $R^1$ is

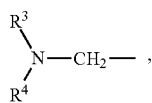

wherein each of $R^3$ and $R^4$, independently of the other, is a hydrocarbon having from 1 carbon atom up to 30 carbon atoms.

8. The particle of modified silica according to claim 1, wherein the surface density of the

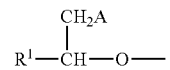

moiety to particle of silica is from 0.1 to 4 µmoles/m$^2$ silica surface.

9. A method of preparing a particle of modified silica according to claim 1, the method comprising reacting a particle of silica and at least one halohydrin compound to form a covalent bond between said particle of silica and said halohydrin compound, wherein the halohydrin compound is of formula (II):

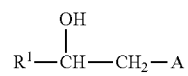

wherein A is a halogen, $SiO_2$ is silica, and $R^1$ is optionally substituted alkyl, alkenyl, alkynyl, aryl, alkylaryl, arylalkyl, heteroalkyl, heterocycle, alkylheterocycle, heterocyclealkyl, or a combination thereof, or $R^1$ is a steroid, wherein the optionally substituted alkyl is an alkyl optionally substituted with an aldehylde; alkoxy; alkanoyloxy; alkoxycarbonyl; alkenyl; alkyl; alkynyl; alkylcarbonyloxy; -alkylNHC(O)alkyl; —C(NH)NH-alkyl; alkylamine; arylamino; arylalkylamino; when the alkyl is —CH$_2$—, (a) $R^O$—O—, wherein $R^O$ is a hydrocarbon of 1 to 30 carbons, (b) $(R^{N1})_2$—N—, wherein each $R^{N1}$ is independently a hydrocarbon of 1 to 30 carbons or (c) $(R^{N2})_3$—N$^+$, wherein each $R^{N2}$ is independent a hydrocarbon of 1 to 4 carbons; aroyl; aryl; aryloxy; azo; —OC(O)NH-alkyl; CONH$_2$; —CONH-alkyl, —CONH-aryl, —CONH-arylalkyl; carboxyl; cyano; methoxy; ethoxy; guanidine, halo, haloalkyl; heteroalkyl; nitrile; nitro; oxo; —SO$_2$NH$_2$; alkyl sulfonyl; aryl sulfonyl; arylalkylsulfonyl; —NHCONH-alkyl.

10. The method according to claim 9, wherein the particle of silica is in the form of a porous particle or a monolithic material.

11. A particle of modified silica obtained by the method as claimed in claim 9.

12. A stationary phase for chromatography comprising the particle of modified silica of claim 1.

13. A separation column for chromatography comprising the particle of modified silica according to claim 1.

14. The particle of modified silica according to claim 6, wherein $R^2$ is a hydrocarbon having from 4 carbon atoms up to 18 carbon atoms.

15. The particle of modified silica according to claim 7, wherein $R^2$ is a hydrocarbon having from 4 carbon atoms up to 18 carbon atoms.

* * * * *